H. S. PIERCE.
SPROCKET WHEEL.
APPLICATION FILED SEPT. 5, 1914.

1,256,590.

Patented Feb. 19, 1918.
2 SHEETS—SHEET 1.

Witnesses—

Inventor—
Harold S. Pierce.
by his Attorneys.
Howson & Howson

H. S. PIERCE.
SPROCKET WHEEL.
APPLICATION FILED SEPT. 5, 1914.
1,256,590.
Patented Feb. 19, 1918.
2 SHEETS—SHEET 2.
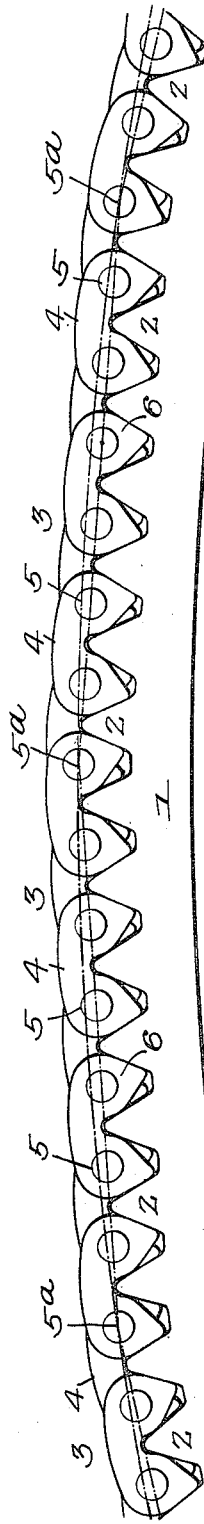
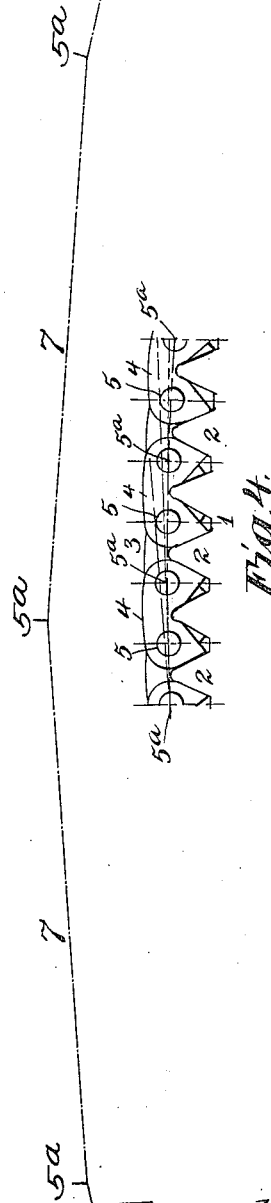
Inventor-
Harold S. Pierce.
by his Attorneys.
Howson & Howson

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

SPROCKET-WHEEL.

1,256,590.

Specification of Letters Patent.   Patented Feb. 19, 1918.

Application filed September 5, 1914.   Serial No. 860,417.

*To all whom it may concern:*

Be it known that I, HAROLD S. PIERCE, a citizen of the United States, residing in Philadelphia, Pennsylvania, have invented certain Improvements in Sprocket-Wheels, of which the following is a specification.

One object of my invention is to secure satisfactory action and durability with chain drives, having the ratio between the wheels greater than those generally employed at the present time, by the utilization of a chain having comparatively short links, so that it can pass around a small sprocket wheel satisfactorily and also around a large sprocket wheel having its periphery consisting of a series of planes, each plane having two or more teeth.

A further object is to cut the teeth of a wheel having a relatively large number of teeth so that two or more links, which are pivotally connected, act as a single unit, thus securing a greater angle of bend at the point of articulation and a correspondingly larger component force acting toward the center of the wheel.

In the accompanying drawings:—

Fig. 2, is an enlarged side view of a section of the wheel illustrated in Fig. 1;

Fig. 3, is a diagram showing the pitch line of the wheel made in accordance with Fig. 2; and Fig. 4, is a view illustrating a modification of the invention.

Figure 1:
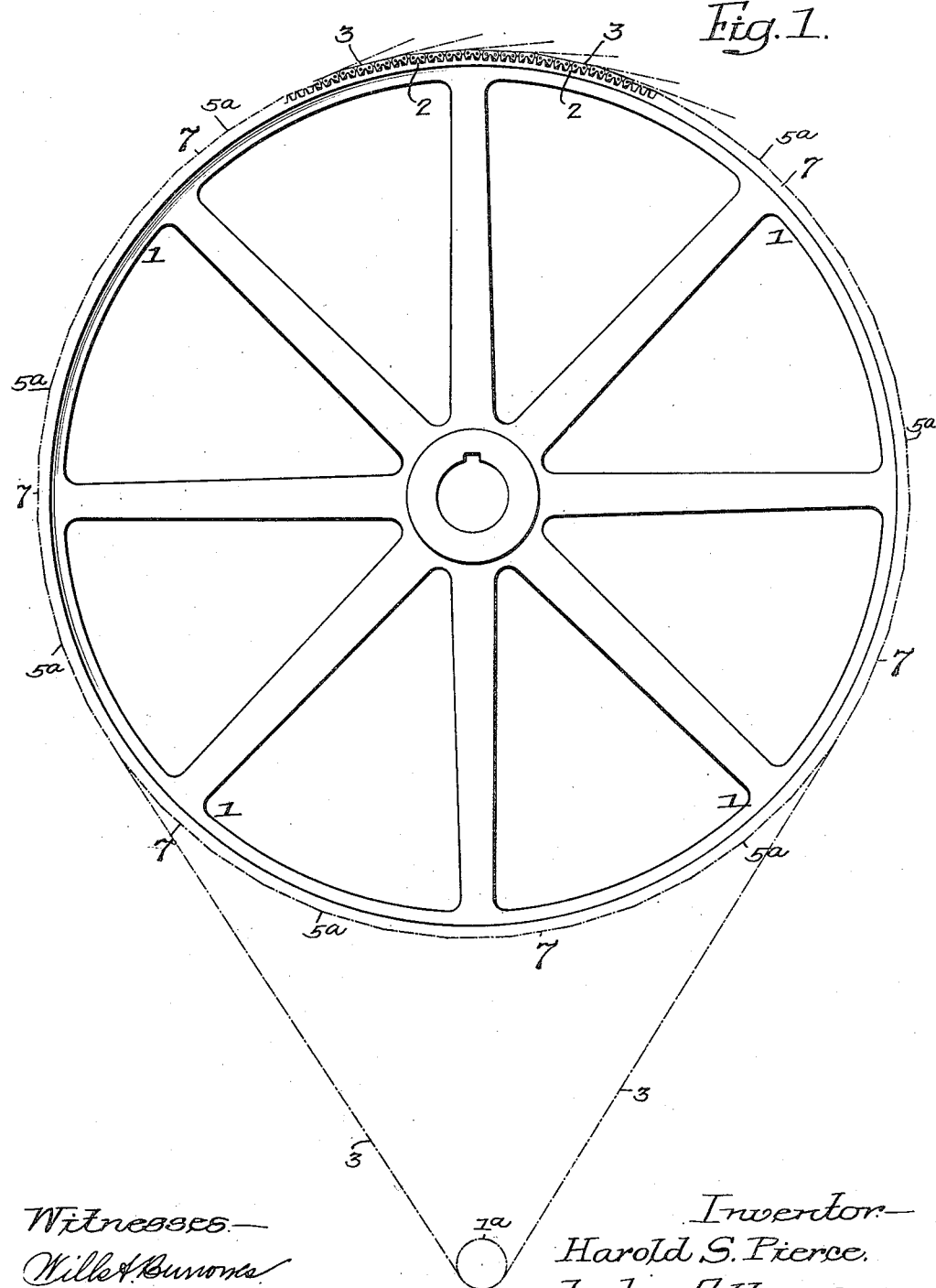
Figure 1, is a side elevation of a large and a small sprocket wheel made in accordance with my invention, the teeth being shown on only a portion of the large wheel.

Link drive chains of the type commonly known as the "silent type" have a tendency to assume their own pitch line on a sprocket and, as an example, about one hundred and eighty teeth is the greatest number which will give a thoroughly satisfactory action between the chains and the sprocket, due to the small angle of bend at the point of articulation and the resulting small component force acting toward the center of the wheel at the point of articulation to bring the chain to its proper seat on the teeth of the sprocket.

By my invention, I am enabled to use a comparatively small sprocket with a large sprocket wheel, the chain consisting of a series of links which are of such a length that they will readily pass around the small sprocket wheel, and I make the large sprocket wheel with a series of flat, or comparatively flat, surfaces, the length of each surface being equal to two or more links, so that while the links articulate on each pivot of the chain, in passing around the small wheel, they articulate only on alternate pivots in some instances, or, as indicated in the drawings, on each seventh pivot, thus enabling a greater reduction to be made than heretofore.

In the drawings, I have illustrated a sprocket wheel having three hundred and one teeth of a five-eighths inch pitch, in which seven of the links act together as a single unit so that the unit of the action is equivalent to a wheel having forty-three teeth and a four and three-eighths pitch.

In the drawings, 1 is a large sprocket wheel having teeth 2, and 1ª is the small sprocket wheel. 3 is the chain made of a series of links 4 pivoted at 5 and having teeth 6 which enter the spaces between the teeth of the sprocket wheels.

In a wheel of this type the centers of all the pivots, or points of articulation, lie on a pitch line taken from the center of the wheel. This previous method is satisfactory on small wheels, but in wheels of large diameter, such as indicated, this method of making the wheel is found to be unsatisfactory. Therefore, I make the wheel 1 so that the chain will be articulated in sections, each section consisting of a certain number of teeth pivotally connected.

In the present instance, as mentioned above, the sprocket is so designed that seven of the links of the chain act as a single unit or, in other words, their pivots, or points of articulation, are on the same plane and the ordinary pitch line is beyond the plane of the pivots of the teeth, except those at the extreme end of each section, as indicated at 5ª, Fig. 2. This is more clearly shown in the diagram, Fig. 3, at 5ª, which are the points, and 7, which is the line or plane on which are all of the other pivots or centers of articulation of the chain.

While I have illustrated, in the drawings, seven links acting together, it will be understood that two or more links may act as a single unit in order to produce a desired result. In other words, for a given angle of face on a chain wheel, there is a limit to the number of teeth which can be satisfactorily employed.

Thus it will be seen that I provide a sprocket wheel with teeth so located that the multiple sections of the chain will lie on a number of chords, rather than on a pitched circle, thus securing a greater angle of bend at the point of articulation and a correspondingly larger component force acting toward the center of the wheel at the point of articulation.

I claim:—

1. The combination of a sprocket chain; a relatively small sprocket wheel having its teeth arranged to cause articulation of each chain link on its pivot in passing around said wheel; and a relatively larger sprocket wheel formed to cause groups of the chain links to act as a series of units in passing around it.

2. The combination of a sprocket chain; a relatively small diameter sprocket wheel having its teeth arranged to cause articulation of each chain link on its pivot in passing around said wheel; and a relatively larger sprocket wheel of generally polygonal form having its teeth arranged to cause groups of the chain links to act as a series of units under operating conditions in passing around it.

In testimony whereof, I have signed my name to this specification, in the presence of two subscribing witnesses.

HAROLD S. PIERCE.

Witnesses:
 Jos. H. KLEINO,
 WM. A. BARR.